(12) United States Patent
Okamoto et al.

(10) Patent No.: US 6,205,105 B1
(45) Date of Patent: Mar. 20, 2001

(54) DISK CARTRIDGE AND DISK CARTRIDGE APPARATUS

(75) Inventors: Tomomi Okamoto; Atsushi Inoue, both of Chigasaki (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/121,129

(22) Filed: Jul. 23, 1998

(30) Foreign Application Priority Data

Aug. 6, 1997 (JP) .................................................. 9-211619
Nov. 10, 1997 (JP) .................................................. 9-306822

(51) Int. Cl.$^7$ .................................................. G11B 17/04
(52) U.S. Cl. .......................................................... 369/77.2
(58) Field of Search ................................. 369/75.1, 75.2, 369/77.1, 77.2, 291; 360/99.02, 99.06

(56) References Cited

U.S. PATENT DOCUMENTS

| 5,537,271 | * | 7/1996 | Kumai et al. | 360/99.06 |
| 5,815,470 | * | 9/1998 | Ohmori et al. | 369/13 |
| 5,883,871 | * | 3/1999 | Shihou | 369/77.2 |
| 5,896,357 | * | 4/1999 | Shinozaki et al. | 369/77.2 |

FOREIGN PATENT DOCUMENTS

| 62-22265 | * | 1/1987 | (JP) . |
| 2-198059 | * | 8/1990 | (JP) . |
| 5-12777 | * | 1/1993 | (JP) . |
| 7-230657 | * | 8/1995 | (JP) . |

* cited by examiner

Primary Examiner—David L. Ometz
(74) Attorney, Agent, or Firm—Antonelli, Terry, Stout & Kraus, LLP.

(57) ABSTRACT

A cartridge for use with a cartridge apparatus and a controlling apparatus. The cartridge houses an information medium therein for at least one of recording information and reproducing information, the cartridge including an opening for enabling access to the information medium, and a shutter disposed on an outer surface of the cartridge and movable from a first position which covers the opening to a second position which uncovers the opening. The cartridge apparatus including a shutter opening and closing control mechanism having a member which engages the shutter when the cartridge is inserted into the cartridge apparatus and moves from an initial position where the shutter is in the first position to another position where the shutter is in the second position during insertion of the cartridge into the cartridge apparatus, the member being moved back to the initial position by the shutter when the cartridge is ejected from the cartridge apparatus.

39 Claims, 20 Drawing Sheets before insertion of cartridge

Pin position A

Pin position B

Pin position C

Pin position C

Pin position B

Pin position A

After ejection of cartridge

Opening and closing pin
rotation direction

DISK CARTRIDGE AND DISK CARTRIDGE APPARATUS

BACKGROUND OF THE INVENTION

The present invention relates to a disk cartridge housing a disk such as an optical disk or a magneto-optical disk and a disk cartridge apparatus using such disks.

Optical disks and magneto-optical disks tend to lower an error rate upon reproduction or tend to cause a write error upon recording when their recording and reproducing surfaces are damaged or smudged. For this reason, it is customary that optical disks and magneto-optical disks are retained within rectangular cartridge cases so as not only to protect the disks, but also to prevent the disks from becoming difficult to handle.

Japanese Patent No. 2607054, for example, describes a disk cartridge. The disk cartridge and the disk cartridge apparatus using such disk cartridge according to the example of the prior art, as shown in FIG. 1, uses a rotatable lever 11 as an opening and closing mechanism for opening and closing a shutter 2. When the disk cartridge 1 is inserted into the disk cartridge apparatus, the lever 11 has a pin 13 which comes in contact with an end of a shutter 2 and the end of the shutter presses the lever as the disk cartridge is inserted into the disk cartridge apparatus, whereby the lever is rotated to slide the shutter, thereby resulting in an opening portion of the cartridge being exposed so as to allow the disk to be accessed. A coil spring 12 is attached to the lever so as to return the lever to the initial position when the disk cartridge is not inserted into the disk cartridge apparatus. Thus, the lever is biased in one direction under spring force. Since the coil spring biases the lever under spring force, when the disk cartridge is ejected from the disk cartridge apparatus, the lever is biased so as to return to the initial position under spring force as the disk cartridge is moved, thereby controlling the opening and closing of the shutter. The above-mentioned arrangement requires a spring for spring-biasing the lever which is used as the shutter opening and closing mechanism.

In order to use a spring, the disk cartridge apparatus requires a space sufficient to dispose the spring. More particularly, for a coil spring, the disk apparatus requires a space having a thickness wider than a coil winding diameter. Thus, a thin disk cartridge apparatus cannot be obtained.

OBJECTS OF THE INVENTION

An object of the present invention is to provide a disk cartridge for use with a disk cartridge apparatus in which a disk cartridge can be inserted in and ejected from the disk cartridge apparatus without a spring biasing member at least being provided in the disk cartridge apparatus so that a thin disk cartridge apparatus is obtainable.

Another object of the present invention is to provide a disk cartridge and a disk cartridge apparatus with a structure for controlling not only an amount of movement of a shutter of the disk cartridge where the disk cartridge is ejected from the disk cartridge apparatus, but also for controlling a shutter opening and closing mechanism of the disk cartridge apparatus in such a manner that the shutter opening and closing mechanism is returned to an initial position when the disk cartridge is not inserted into the disk cartridge apparatus.

A further object of the present invention is to provide a shutter of the disk cartridge with a hook shaped portion for coupling with a part of a shutter opening and closing mechanism of the disk cartridge apparatus, with the cartridge including a spring biasing member for the shutter.

SUMMARY OF THE INVENTION

In accordance with the present invention, there is provided a cartridge for use with a cartridge apparatus, wherein the cartridge houses an information medium therein for at least one of recording information and reproducing information, the cartridge including an opening for enabling access to the information medium, and a shutter disposed on an outer surface of the cartridge and movable from a first position which covers the opening to a second position which uncovers the opening, the cartridge apparatus including a shutter opening and closing control mechanism having a member for engaging the shutter when the cartridge is inserted into the apparatus and moveable from an initial position where the shutter is closed to another position where the shutter is opened during insertion of the cartridge into the apparatus, the member being moved back to the initial position by the shutter when the cartridge is ejected from the cartridge apparatus.

According to the features of the present invention, in a disk cartridge apparatus for loading a disk cartridge comprising a case having an opening portion, a disk housed within the case and a shutter, the disk cartridge apparatus includes a shutter moving member for moving the shutter in the direction in which the opening portion is opened and in the direction in which the disk cartridge is inserted and in which the shutter moving member linearly moves while in contact with the shutter to move the shutter in the direction in which the opening portion is opened when the disk cartridge is loaded onto the disk cartridge apparatus.

In accordance with other features of the present invention, in a disk cartridge comprising a case having an opening portion and a shutter and housing a disk within the case, the disk cartridge is characterized in that the shutter includes a contact portion which comes in contact with a shutter moving member disposed within the disk apparatus and in which the shutter is moved in the direction perpendicular to the insertion direction by applying a force for moving the shutter moving member in the insertion direction of the disk apparatus from the contact portion when the disk cartridge is inserted into the disk apparatus.

These and other objects, features and advantages of the present invention will become more apparent from the following description when taken in conjunction with the accompanying drawings.

DESCRIPTION OF THE PREFERRED EMBODIMENTS

Figure 1:
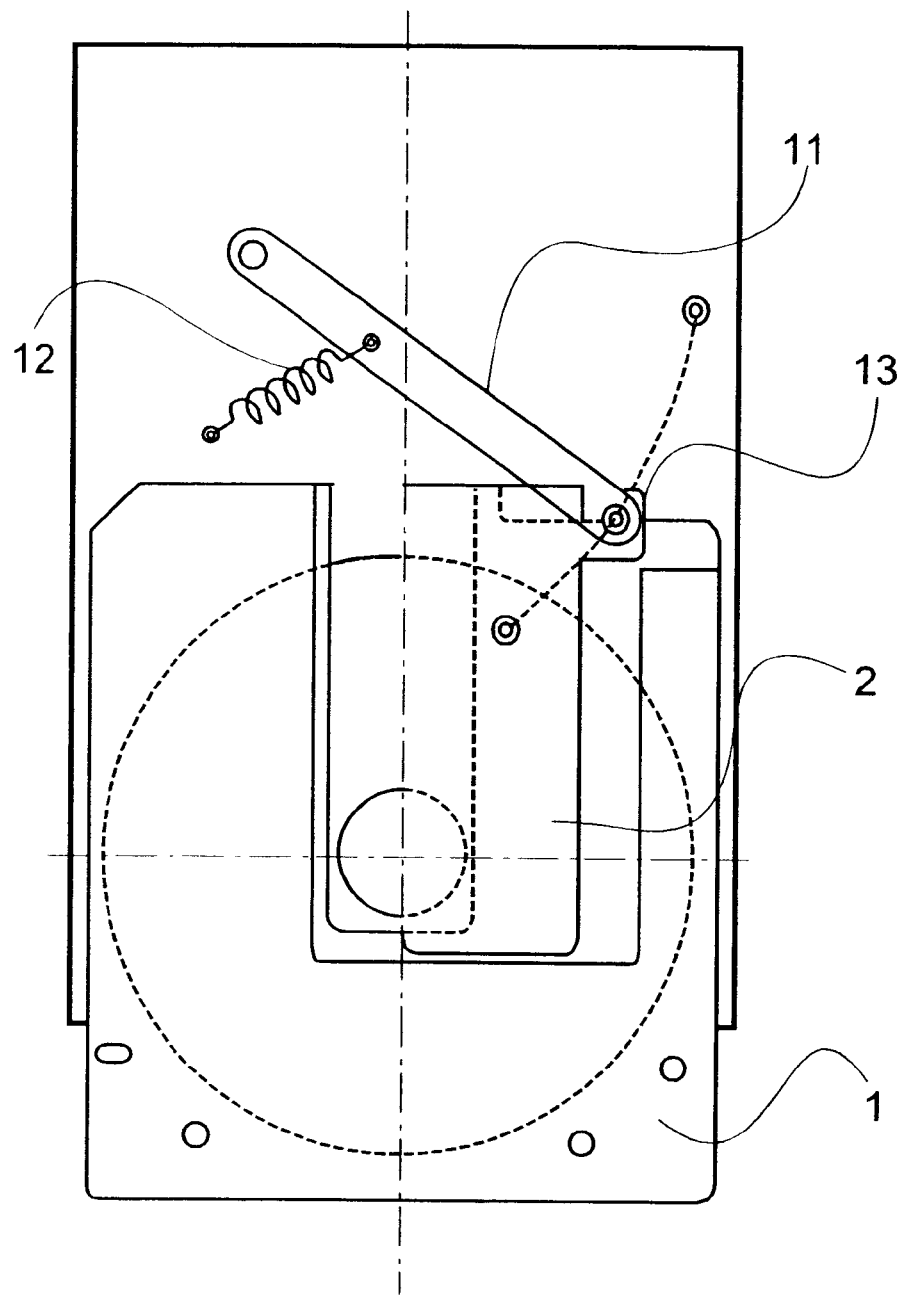
FIG. 1 illustrates a shutter opening and closing arrangement according to the prior art and the manner in which the shutter opening and closing arrangement is operated when a cartridge is inserted into a disk cartridge apparatus.

Referring now to the drawings wherein like parts are designated by like reference numerals, different embodiments are described with reference to FIGS. 2–23.

Figure 2A:
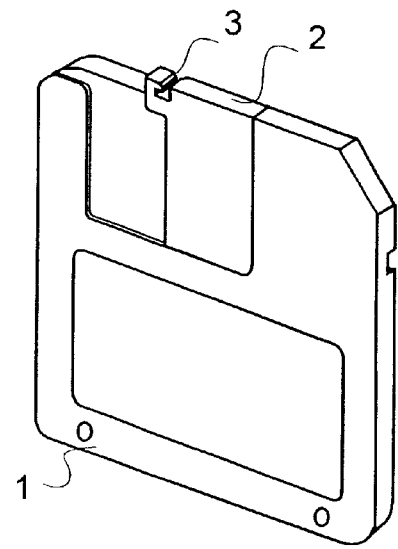
FIGS. 2(a)–2(c) show an embodiment of a disk cartridge according to the present invention illustrating a shutter opening and closing mechanism contact portion.
Figure 2B:
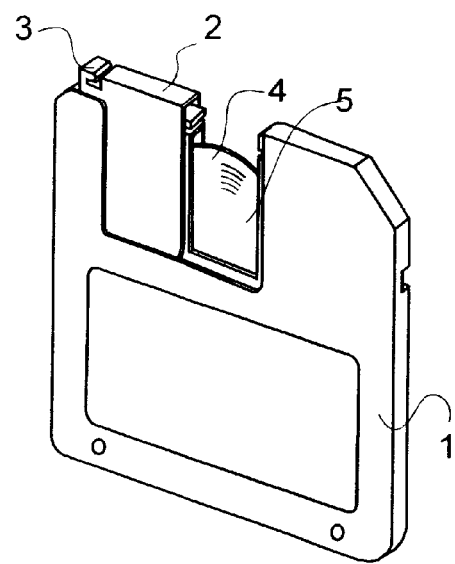
Figure 2C:
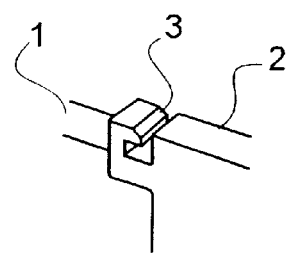
Figure 4:
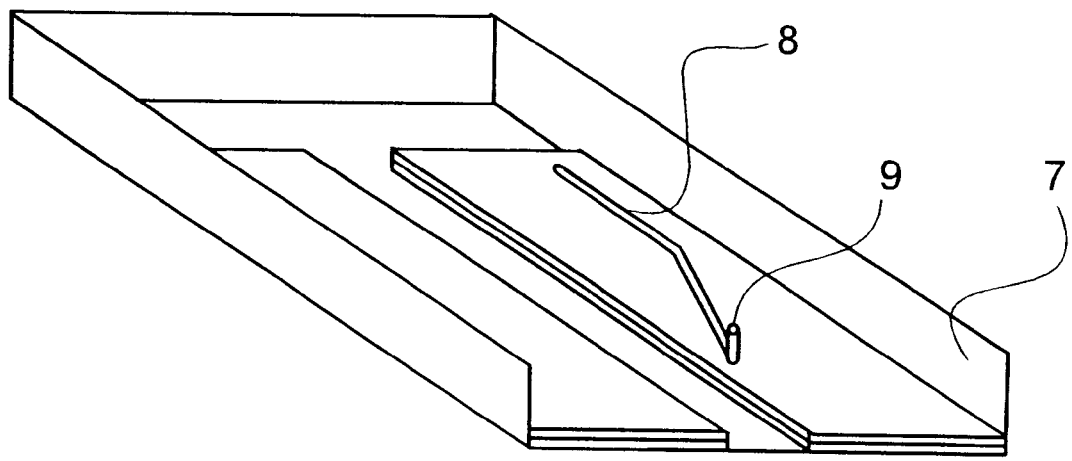
FIG. 4 shows a part of a disk cartridge apparatus according to the present invention illustrating a shutter opening and closing arrangement thereof.

FIG. 2(a) shows a shutter 2 attached to a disk cartridge 1 in a closed position and in which an information recording medium such as a disk 4 retained within the disk cartridge is not exposed to the outside. Therefore, the disk can be protected from being smudged and damaged, and also a user is prevented from touching a disk recording/reproducing surface inadvertently. This shutter 2 has a structure such that it can be slid in the left-hand direction of FIG. 2(a). FIG. 2(b) shows the shutter 2 after being slid in the left-hand direction to an open position. When the shutter 2 is slid to the open position, the disk cartridge 1 exposes an opening portion 5 to enable the disk 4 retained therein to be accessed from the outside. The shutter 2 can be slid by a force obtained when its shutter opening and closing mechanism contact portion 3 comes in contact with the shutter opening and closing mechanism disposed in the disk cartridge apparatus. Because this embodiment assumes a system in which a disk such as a magneto-optical disk having two sides is handled, a similar opening portion 5 is defined on the reverse side of the disc cartridge 1 shown in FIG. 2(a). However, the reverse side transmits a power for driving the disk so that the opening portion 5 is provided near the center of the disk 4. FIG. 2(c) is a perspective view illustrating a portion near the shutter opening and closing mechanism contact portion 3 in an enlarged scale. The contact portion 3 is shaped as a hook, and this contact portion can be engaged with a shutter opening and closing pin 9 as shown in FIG. 4. The contact portion 3 is chamfered so that the shutter opening and closing pin 9 is easily entered into the contact portion 3. While the contact portion is shaped in the form of a letter U or letter C in FIG. 2(c), the present invention is not limited thereto, and the contact portion may have various shapes so long as it is engageable with the shutter opening and closing pin 9.

Figure 3A:
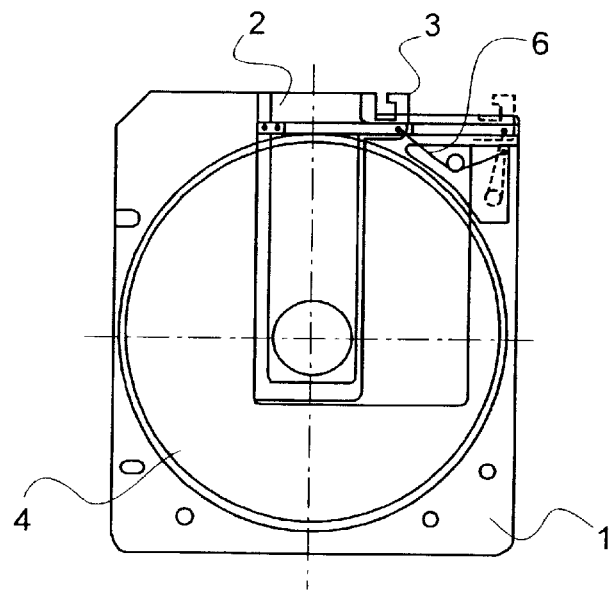
FIGS. 3(a)–3(b) show the embodiment according to the present invention illustrating a shutter spring-biasing member disposed within the disk cartridge.
Figure 3B:
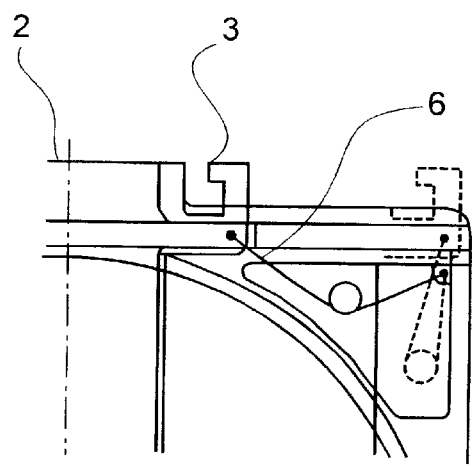

FIG. 3(a) is a rear view of FIG. 2(a) while showing an overall arrangement of the disk cartridge 1 including interior features thereof. FIG. 2(b) shows the shutter opening and closing mechanism contact portion 3 and a portion near a shutter spring 6 in an enlarged scale. As illustrated, the shutter spring 6 is a torsion spring, and is constantly spring-biased in the direction in which the shutter 2 is closed. When the shutter 2 is slid, the shutter spring 6 is twisted to increase a spring force in the direction in which the shutter 2 is returned to the original position. At the time point at which an external force for sliding the shutter 2 is removed or released, the shutter spring 6 recovers to slide the shutter 2 to the original position. While this embodiment uses the torsion spring for spring-biasing the shutter 2, the present invention is not limited thereto, and other spring-biasing arrangements such as a coil spring may be used.

FIG. 4 shows a shutter opening and closing mechanism of a disk cartridge apparatus according to this embodiment. The shutter opening and closing mechanism mainly comprises a disk cartridge guide case 7, a shutter opening and closing guide pin 9 and a shutter opening and closing guide pin guide slot 8, etc. The shutter opening and closing guide pin 9 is able to freely slide along the guide slot 8. When the shutter 2 attached to the disk cartridge 1 is inserted into the disk cartridge guide case 7 of the disk cartridge apparatus, the slide amount of the shutter 2 is determined relative to its insertion amount. This slide amount is determined based on the shape of the guide slot 8.

Figure 5:
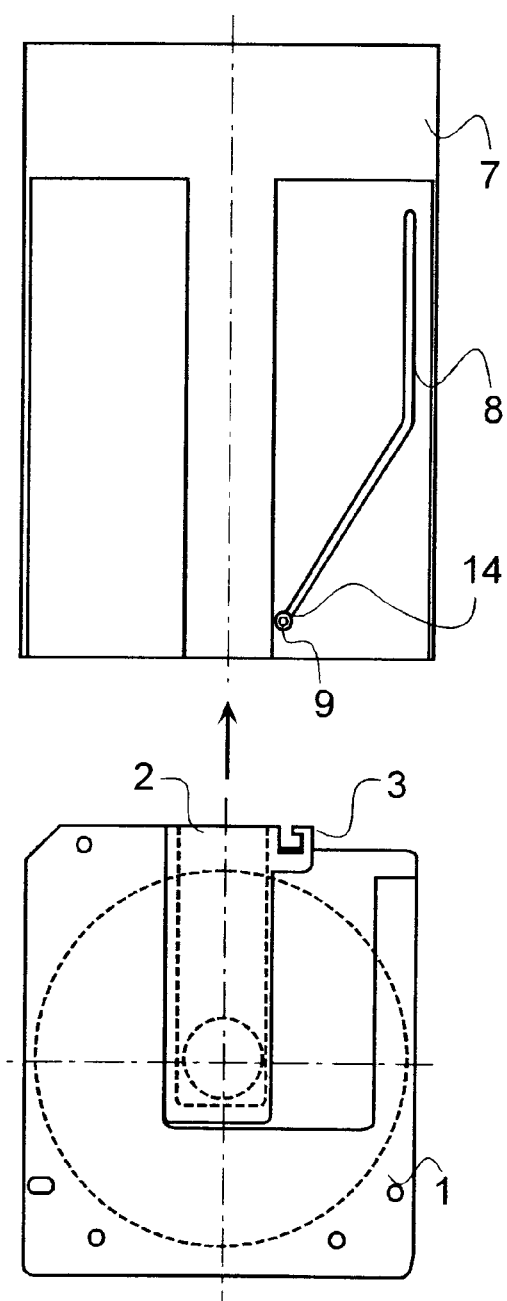
FIG. 5 showing the arrangement of the shutter of the disk cartridge and the shutter opening and closing arrangement of the disk cartridge apparatus prior to insertion of the disk cartridge into the disk cartridge apparatus.
Figure 6:
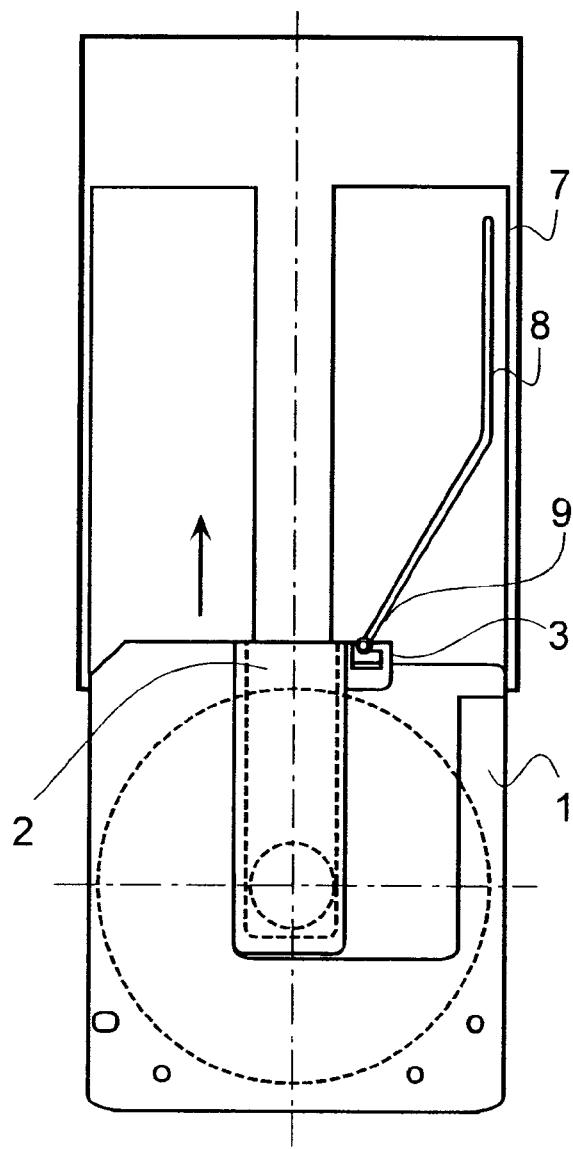
FIG. 6 shows the manner in which the shutter and the shutter opening and closing arrangement are operated when the disk cartridge is initially inserted into the disk cartridge apparatus.
Figure 7:
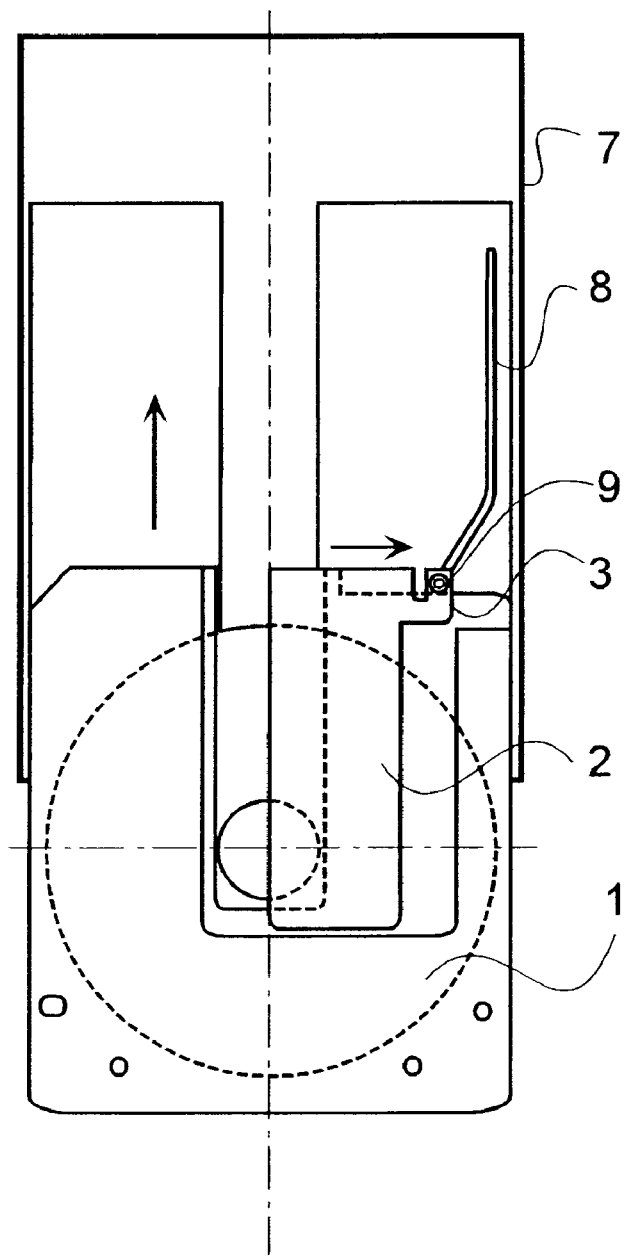
FIG. 7 shows the manner in which the shutter and the shutter opening and closing arrangement are operated when the disc cartridge is further inserted into the disk cartridge apparatus.
Figure 8:
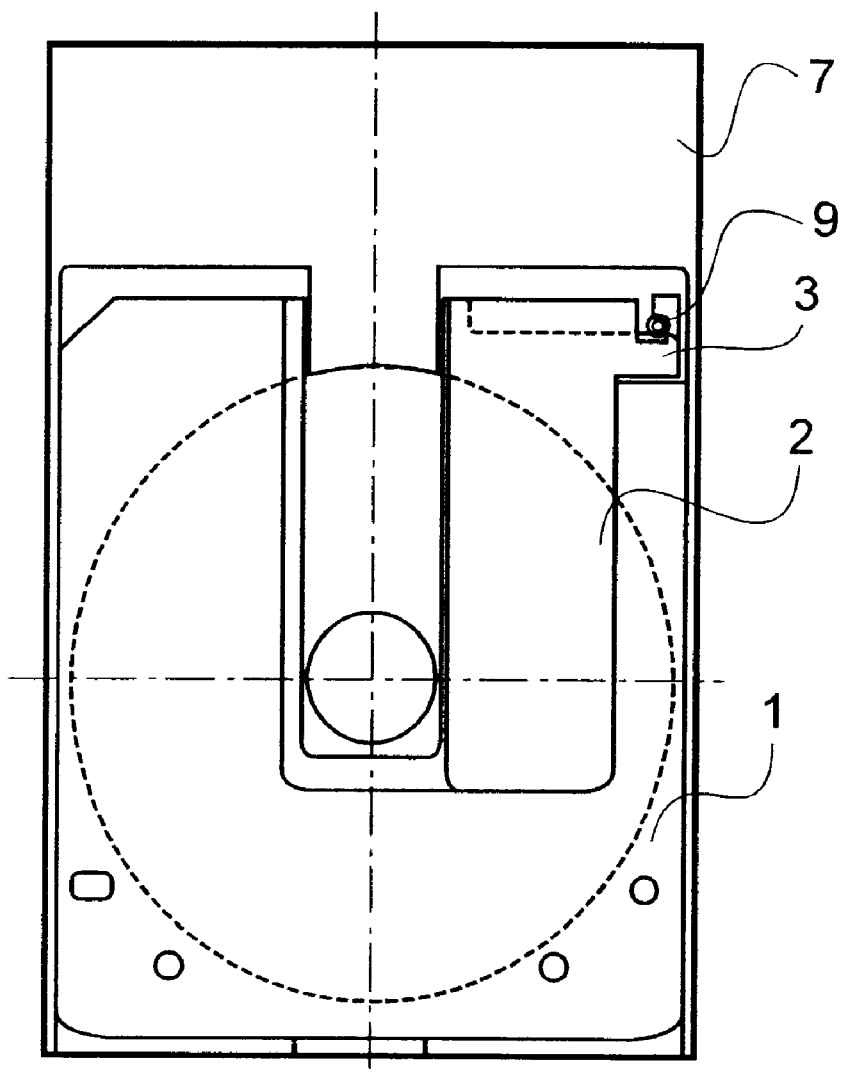
FIG. 8 shows the manner in which the shutter and the shutter opening and closing arrangement are operated when the disk cartridge is fully inserted into the disk cartridge apparatus.

Operations of the disk cartridge and the shutter opening and closing mechanism of the disk apparatus according to this embodiment will be described with reference to FIGS. 5 to 8. FIG. 5 shows the state presented before the disk cartridge 1 is inserted into the disk cartridge guide case 7 of the disk cartridge apparatus. In this state, the shutter 2 of the disk cartridge 1 is spring-biased by the shutter spring 6 so as to close the opening portion of the disk cartridge. The shutter guide pin 9 of the shutter opening and closing mechanism of the disk cartridge guide case is placed at an initial position 14. The shutter guide pin 9 is a member for causing sliding of the shutter 2, and is constantly placed at this initial position 14 before the disk cartridge 1 is inserted into the disk apparatus. The initial position 14 is the position which just opposes the shutter opening and closing mechanism contact portion of the disk cartridge 1 when the disk cartridge 1 is inserted into the disk apparatus. FIG. 6 shows this state. As the disk cartridge 1 is inserted progressively, the shutter opening and closing pin 9 enters the inside of the contact portion from the clearance portion of the contact portion 3. FIG. 7 shows the state in which the disk cartridge 1 is inserted further into the disk apparatus than the state shown in FIG. 6. The disk cartridge 1 is further inserted into the disk apparatus, whereby the shutter opening and closing pin 9 also contacts with the edge of the disk cartridge 1 and is thereby urged to move in the depth direction of the disk cartridge apparatus. However, since the movement of the shutter opening and closing pin 9 is restricted by the guide slot 8, the guide pin 9 is moved in the direction of the guide slot. Since the guide pin 9 is in contact with the contact portion 3 of the shutter 2, the shutter 2 is caused to slide in the right-hand direction of the sheet of drawing in accordance with the movement amount of the guide pin 9. The guide slot 8 is formed in such a manner that, when the disk cartridge 1 is placed at a loading completion position of the disk apparatus as shown in FIG. 8, the shutter 2 completes a predetermined amount of its sliding movement so that the opening portion of the disk cartridge is fully exposed to enable accessing of the disk.

When the disk cartridge 1 is ejected from the disk apparatus, opposite processes to that of FIGS. 5 to 8 are executed. However, since the shutter opening and closing pin 9 of the disk cartridge apparatus does not include a spring-biasing for returning the pin 9 to the initial position 14 under spring force, it is necessary to provide a particular arrangement for returning the shutter opening and closing pin 9 to the original position. Heretofore, in the conventional disk apparatus of the prior art such as shown in Japanese Patent No. 2607054, there has been used a spring 12 which urges the shutter opening and closing mechanism to return to the initial position as shown in FIG. 1. The shutter opening and closing mechanism shown in FIG. 1 uses a shutter opening and closing lever 11 for opening and closing a shutter and a shutter opening and closing pin 13. Then, the shutter opening and closing lever 11 is spring-biased by a lever spring 12 in the initial position direction. When the disk cartridge is ejected from the disk apparatus, a dynamic stability of the lever spring 12 urges the shutter opening and closing lever 11 to return to the initial position. However, in this example, it is necessary to provide the lever spring 12, and the lever spring 12 is required to be displaced in the thickness direction of the apparatus in order to avoid the interference with the disk cartridge. To this end, the apparatus at least requires a thickness corresponding to the thickness of the lever spring 12.

According to the present invention, a force by which the shutter 2 is closed is also used in order to return the shutter opening and closing pin 9 to the initial position 14. This will be described with reference to FIGS. 9(*a*) and 9(*b*), wherein FIG. 9(*a*) shows the state in which the shutter opening and closing mechanism contact portion and the shutter opening and closing pin are presented when the disk cartridge is inserted into the disk apparatus and FIG. 9(*b*) shows the state in which the shutter opening and closing mechanism contact portion and the shutter opening and closing pin are presented when the disk cartridge is ejected from the disk apparatus.

Figure 9A:
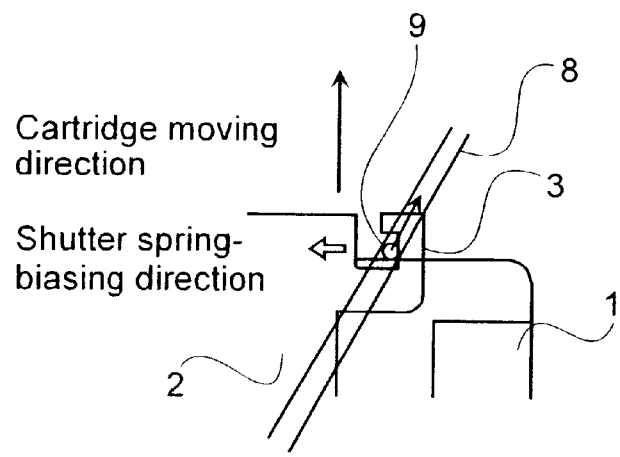
FIGS. 9(a)–9(b) show a portion with which the shutter and the shutter opening and closing arrangement contact one another when the disk cartridge is inserted into the disk cartridge apparatus and is ejected therefrom, respectively.
Figure 9B:
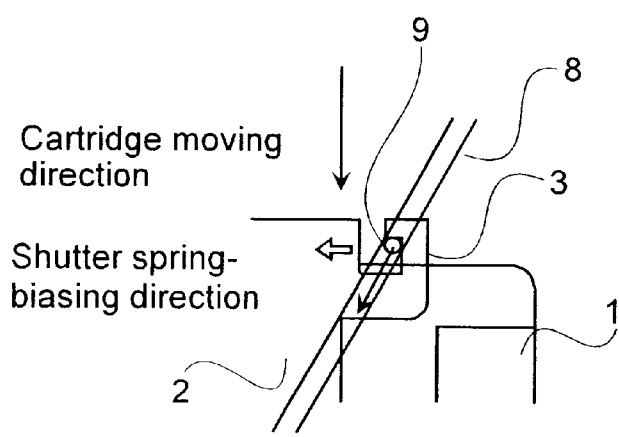

When the disk cartridge is inserted into the disk apparatus, as shown in FIG. 9(*a*), the shutter opening and closing pin 9 contacts the contact portion 3 and the edge of the disk cartridge 1 and is progressively moved along the guide slot 8 as the disk cartridge is inserted into the disk apparatus, thereby resulting in the shutter 2 being opened. On the other hand, when the disk cartridge is ejected from the disk apparatus, the shutter opening and closing pin 9 is engaged with the hook portion of the contact portion 3. Although the shutter opening and closing pin 9 is moved along the guide slot 8 as the disk cartridge 1 is progressively ejected from the disk apparatus, the shutter 2 is constantly spring-biased by the shutter spring 6 housed within the disk cartridge 1 in the closing direction of the shutter 2 with the result that the shutter 2 also is moved as the shutter opening and closing pin 9 is moved, thereby resulting in the shutter opening and closing pin 9 being returned to the initial position 14 without being disengaged from the hook portion of the contact portion 3. Finally, when the shutter 2 is closed completely and the sliding of the shutter is ended, the shutter opening and closing pin 9 which is moved along the guide slot 8 is disengaged from the hook portion of the contact portion 3, and hence the disk cartridge 1 becomes able to be ejected from the disk apparatus. Incidentally, the guide slot 8 is extended to the extent that the shutter opening and closing pin 9 can be disengaged from the contact portion 3.

Figure 10A:
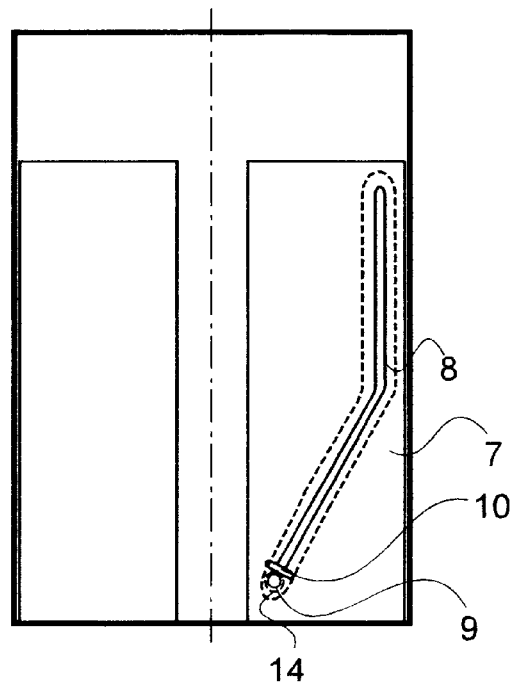
FIGS. 10(a)–10(c) show the shutter opening and closing arrangement of the disk cartridge apparatus.
Figures 10B, 10C:
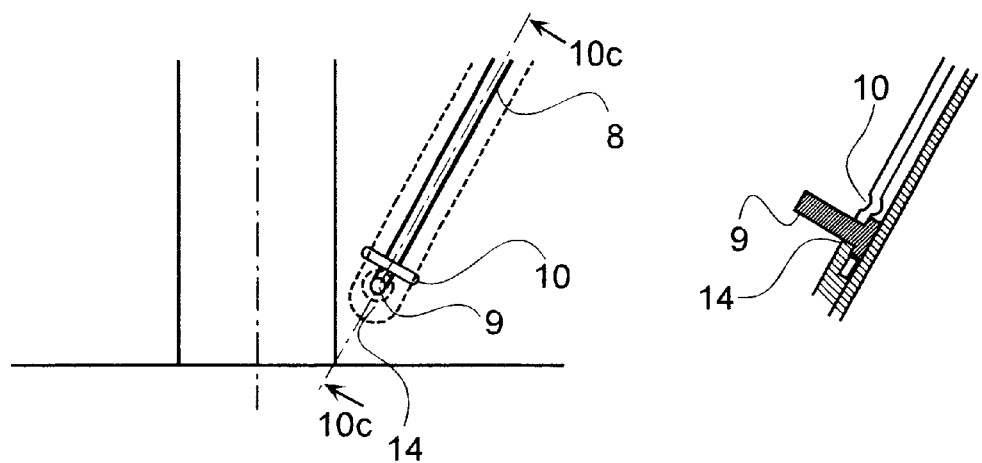

In the present invention, the shutter opening and closing pin 9 is able to freely move in the direction of the guide slot 8. However, the shutter opening and closing pin has to be always placed at the initial position 14 before the disk cartridge 1 is inserted into the disk apparatus. Otherwise, the shutter opening and closing pin 9 could not enter the contact portion 3 so that the shutter 2 becomes unable to slide. To solve this problem, the shutter opening and closing pin 9 should be arranged such that the shutter opening and closing pin becomes difficult to move from the initial position 14 when the disk cartridge 1 is not inserted into the disk apparatus. By way of example, as shown in FIGS. 10(*a*)–10(*c*), it is considered that the guide slot 8 is partly reduced in thickness in the portion 10 as shown in FIG. 10(*c*) which is a sectional view of FIG. 10(*b*) taken along line 10C—10C, FIG. 10(*b*) being an enlarged view of part of FIG. 10(*a*), whereby the shutter opening and closing pin 9 can be prevented from being moved by this reduced portion 10 when the shutter opening and closing pin 9 is placed at the initial position 14. When the disk cartridge 1 is inserted/ejected into/from the disk apparatus, the shutter opening and closing mechanism contact portion 3 forces the shutter opening and closing pin 9 to move so that the shutter opening and closing mechanism contact portion can be freely slid along the guide slot through the reduced thickness portion 10. However, when the disk cartridge 1 is not inserted into the disk apparatus, owing to the reduced thickness portion 10, the shutter opening and closing pin 9 cannot be moved from the initial position 14.

Figure 11:
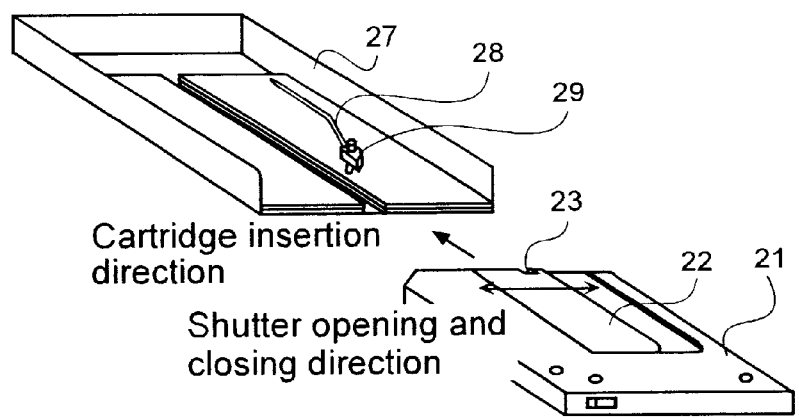
FIG. 11 shows another embodiment of the present invention illustrating a disk cartridge and a shutter opening and closing mechanism arrangement of a disk cartridge apparatus.
Figure 12:
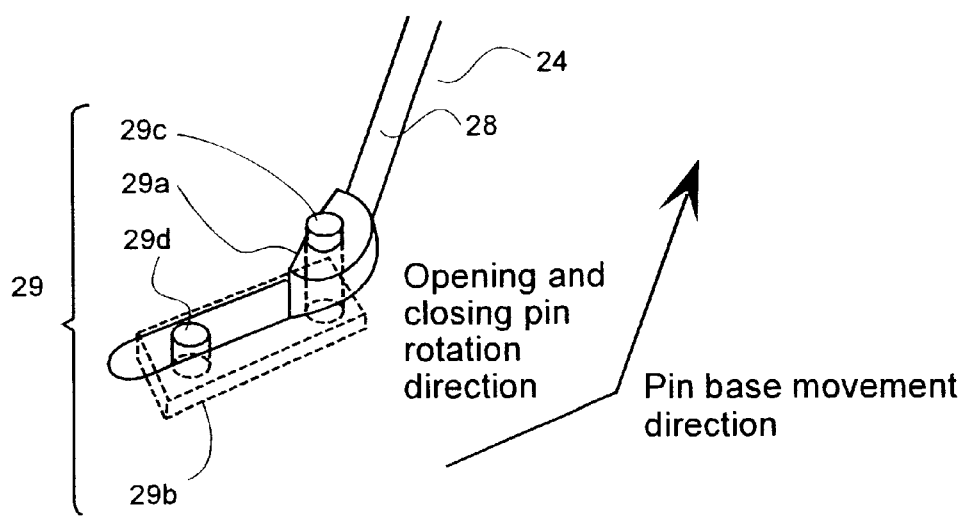
FIG. 12 shows in more detail a structure of the shutter opening and closing part of the shutter opening and closing mechanism of FIG. 11.
Figure 13:
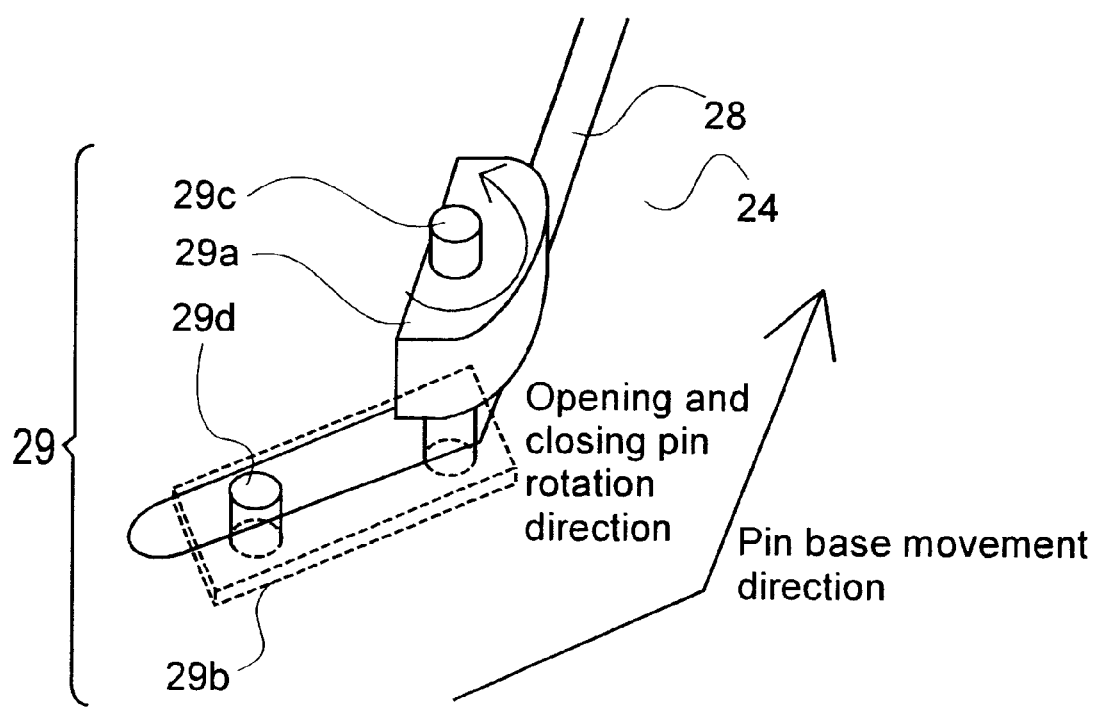
FIG. 13 shows the structure of the shutter opening and closing part of the shutter opening and closing mechanism of FIG. 11 in further detail.

FIG. 11 shows an a disk cartridge 21 and a shutter opening and closing mechanism having a disk cartridge guide case 27 which is a part of a disk cartridge apparatus according to another embodiment of the present invention. An insertion direction of the disk cartridge 21 and an opening direction of a shutter 22 are shown by arrows in the sheet of drawing, respectively, and they are substantially perpendicular to each other. A shutter opening and closing mechanism includes a shutter opening and closing member 29 and a guide slot 28 for restricting a movement direction of the shutter opening and closing member. A configuration of this guide slot 28 is determined based on a ratio of an opening amount of the shutter 22 relative to an insertion amount of the disk cartridge 21 and a layout of other assemblies composing the disk apparatus or the like. The shutter opening and closing member 29 is shaped in such a manner that a tip end part 29a as shown in FIGS. 12 and 13 is partially cylindrical and has a pin part 29c. On the other hand, the shutter 22 is provided with a contact portion 23 which comes in contact with the shutter opening and closing part 29a. When the disk cartridge 21 is inserted into the disk apparatus, this shutter opening and closing part 29a and the contact portion 23 contact each other. When the disk cartridge is further inserted into the disk apparatus, the shutter opening and closing part 29a and the contact portion 23 are coupled with each other, i.e. the shutter opening and closing part 29a and the contact portion 23 can be prevented from being disengaged during a period in which the disk cartridge is being loaded onto the disk apparatus.

This coupling between the shutter opening and closing pin and the contact portion can be maintained even under the condition that the disk cartridge 21 is completely loaded into the disk apparatus. This coupling is not released until the disk cartridge 21 is moved close to the portion in which the shutter opening and closing part 29a and the contact portion 23 are coupled to each other when the disk cartridge 21 is ejected from the disk apparatus.

FIG. 12 shows the shutter opening and closing mechanism including the shutter opening and closing member 29 and the guide slot 28 for guiding the shutter opening and closing member 29. The shutter opening and closing member 29 includes a base 29b of rectangular shape disposed under a guide plate 24 with the guide slot 28 defined therein. Two pins 29c and 29d are disposed on the pin base 29b and each of the pins is restricted by the guide slot 28. As a result, when the direction of the guide slot is changed, the direction of the pin base 29b also is changed. For example, when the pin base 29b is moved in the direction shown by an arrow in FIG. 12, the shutter opening and closing part 29a is rotated in the arrow direction in the sheet of drawing. Incidentally, of the shutter opening and closing pins 29c, 29d, the shutter opening and closing pin 29d is too short to protrude from the guide plate 24 with the guide slot 28 defined therein. On the other hand, the shutter opening and closing pin 29c having the part 29a thereon is longer than the shutter opening and closing pin 29d, and the shutter opening and closing part 29a is coupled with the contact portion 23 of the shutter 22.

FIG. 13 more clearly shows the shape of the tip end of the shutter opening and closing part 29a which is coupled to the contact portion 23 of the shutter. As shown in FIG. 13, the tip end of the shutter opening and closing part 29a is a partial cylindrical member having a flat edge (hereinafter referred to as a "D cut"). This part 29a having the shape of the D cut together with the pin portion 29c is rotated as the pin base 29b is moved, thereby enabling coupling of the shutter opening and closing part 29a to the contact portion 23 of the shutter 22 or the release of the aforementioned coupling.

Figure 14:
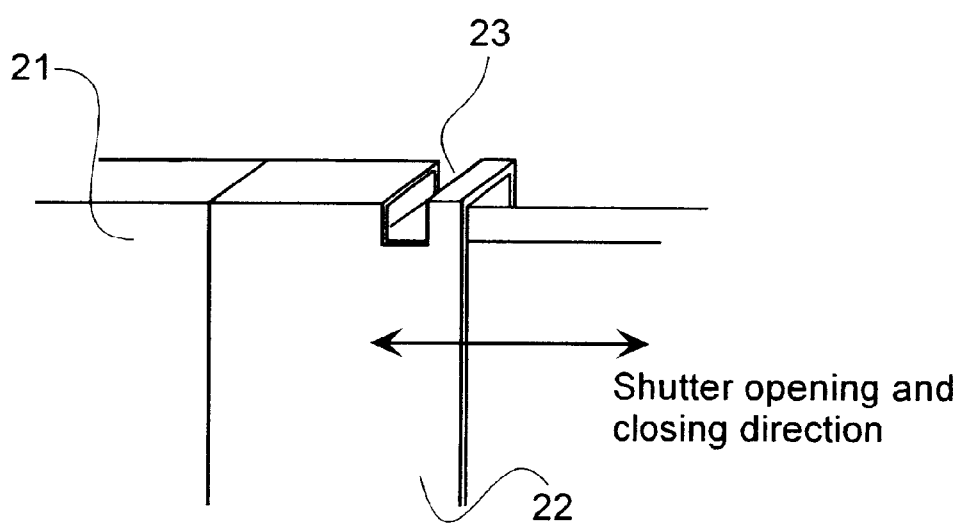
FIG. 14 shows a shutter opening and closing contact portion of a shutter of a disk cartridge according to the embodiment of FIG. 11.

FIG. 14 shows the shape of the contact portion 23 which comes in contact with the shutter opening and closing part 29a. The shutter 22 is generally made of a thin metal or resin, and the contact portion 23 is a recess defined in part of the shutter.

Figure 15:
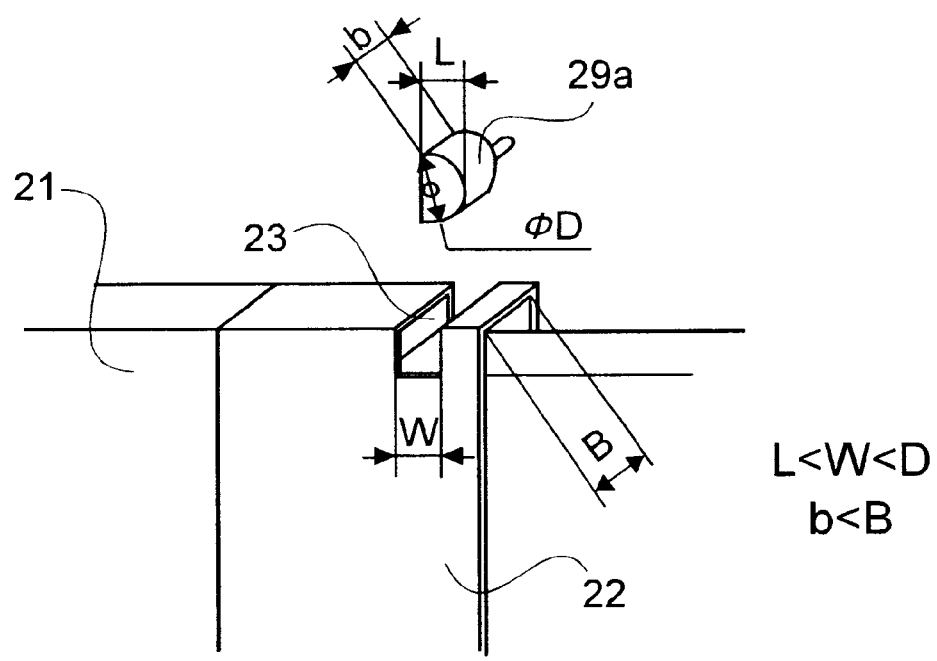
FIG. 15 shows a relationship between the shutter opening and closing contact portion of the shutter of the disk cartridge and the shutter opening and closing part of the disk cartridge apparatus.

FIG. 15 shows a relationship between the contact portion 23 of the shutter 22 and the shutter opening and closing part 29a. A relationship between the contact portion 23 and the shutter opening and closing part 29a in size is established, as shown in FIG. 15, so as to satisfy the following equations:

$$L < W < D$$

$$b < B$$

where L, D and b represent dimensions of the partial cylindrical member of part 29a from the flat edge to the cylindrical edge, along the flat edge and in the depth direction, respectively, and W and B represent dimensions of the recess of the contact portion 23 in the width and depth direction, respectively, $\phi$ represents the angle of rotation.

When the shutter opening and closing part 29a is moved to the contact portion 23 under the condition that L and W become parallel to each other, the shutter opening and closing part 29a is completely inserted into the contact portion 23. When the shutter opening and closing part 29a is rotated due to movement of the base 29b, since W<D, the shutter opening and closing part 29a and member 29 cannot be disengaged from the contact portion 23. The present invention enables couple/release of the contact portion 23 and the shutter opening and closing part 29a by effectively utilizing this relationship.

Incidentally, according to the present invention, if the disk cartridge 1 does not include a spring-biasing arrangement such as a spring for closing the shutter 22, then no problem occurs in the opening and closing the shutter within the disk cartridge apparatus. The disk cartridge which is not provided with a shutter spring-biasing arrangement generally includes a shutter lock mechanism for preventing a shutter from inadvertently being opened outside the apparatus. When the cartridge according to the present invention omits the shutter spring-biasing arrangement, but includes the shutter lock mechanism, it is recommended that the shutter lock mechanism is disposed in the vicinity of the shutter contact portion 23 so that the shutter lock mechanism may be released by introducing the shutter opening and closing part 29a into the contact portion 23.

FIGS. 16(a)–16(e) and 17(a)–17(e) show the process in which the shutter opening and closing pin 29 and the contact portion 23 of the shutter 22 are coupled to each other. FIGS. 16(a)–16(d) show the manner in which the disk cartridge 1 is inserted into the disk apparatus. Through the processes in the order of FIGS. 16(a) to 16(d), the disk cartridge 1 is loaded onto the disk apparatus in such a manner that a disk can be reproduced or recorded. Incidentally, FIGS. 16(a) to 16(d) generally show only the contact portion 23 of the shutter 22 and the D cut portion of the shutter opening and closing part 29a of the member 29.

Figure 16A:
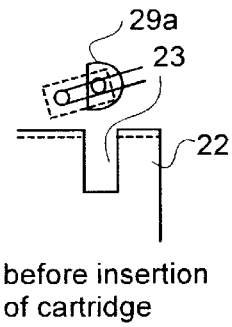
FIGS. 16(a)–16(e) show the manner in which the shutter and the shutter opening and closing part are coupled to each other when the disk cartridge is inserted into the disk cartridge apparatus.
Figure 16B:
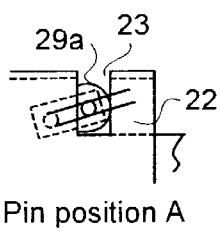
Figure 16C:
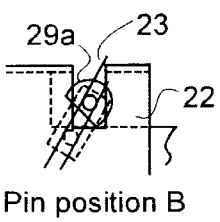
Figure 16D:
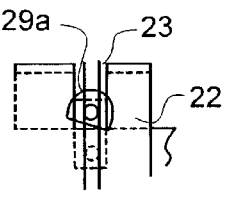
Figure 16E:
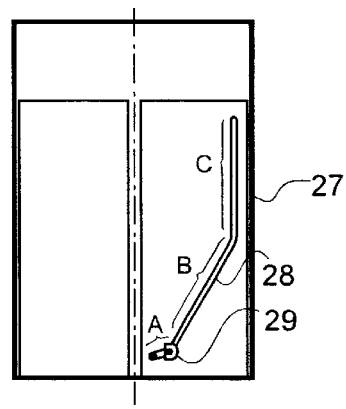

FIG. 16(e) shows exact positions at which the shutter opening and closing part 29a is placed under the respective states shown in FIGS. 16(a) to 16(d). As is clear from FIG. 16(e), since the guide slot 28 has three inclinations, respective areas are set to A to C. Initially, FIG. 16(a) shows the state presented before the disk cartridge 1 is inserted into the disk apparatus. At that time, the shutter opening and closing part 29a is located in the area A, and set in the direction in which the width of the D-cut member becomes smallest as seen from the disk cartridge 1. When the insertion of the disk cartridge 1 is started, initially, as shown in FIG. 16(b), the disk opening and closing part 29a is introduced into the contact portion 23. When the disk cartridge 1 is further inserted into the contact portion under this condition, the shutter opening and closing part 29a is advanced into the area B of the guide slot 28. At that time, due to a difference between directions in which slots of the areas A and B are formed, the shutter opening and closing part 29a is rotated in accordance with the change of the direction of the pin base 29b shown in FIG. 12. As a result, in the area B, as shown in FIG. 16(c), the shutter opening and closing part 29a is advanced along the guide slot 28 under the condition that it is being rotated. At that time, the shutter 2 is caused to slide and is opened simultaneously. When the shutter opening and closing part 29a is rotated, the D-cut member also changes its direction with the result that the shutter opening and closing part 29a due to the aforementioned relationship with the recess of the contact portion 23 can be prevented from being disengaged from the contact portion 23 of the shutter. This is also true when the shutter opening and closing part 29a is moved up to the area C. Thus, the shutter opening and closing part 29a is oriented as shown in FIG. 16(d). Also, when the shutter opening and closing part 29a reaches the area C, the shutter is already moved or opened by a sufficient amount to expose the disk for access.

Figure 17A:
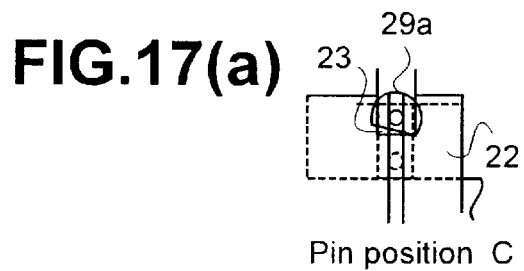
FIGS. 17(a)–17(e) show the manner in which the shutter and the shutter opening and closing part are coupled to each other when the disk cartridge is ejected from the disk cartridge apparatus.
Figure 17B:
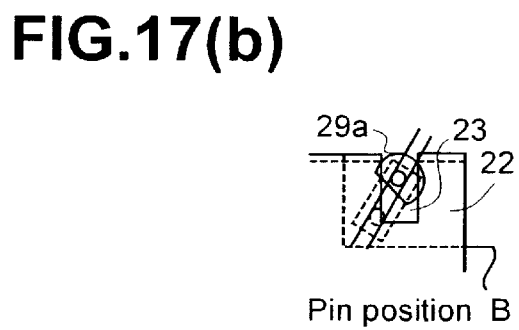
Figure 17C:
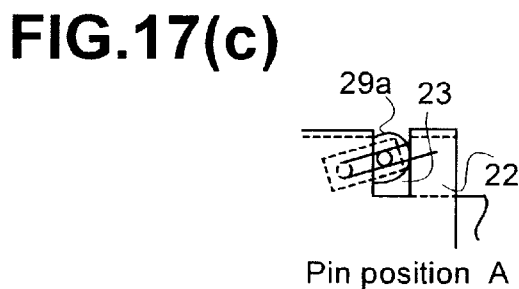
Figure 17D:
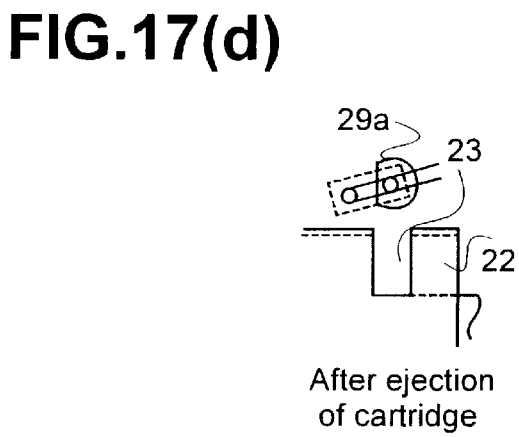

FIGS. 17(a)–17(e) shows the manner in which the disk cartridge 1 is ejected from the disk apparatus. When the disk cartridge 1 is retained within the disk apparatus, the shutter opening and closing part 29a is located in the area C so that the shutter opening and closing pin is coupled to the shutter 22 in the direction shown in FIG. 17(a). Since the width W of the contact portion 23 of the shutter 22 is smaller than the diameter D of the D-cut member of the shutter opening and closing part 29a, the coupling between shutter opening and closing member and the shutter is not released. As a consequence, when the disk cartridge 1 is ejected to the outside, the shutter opening and closing part 29a also is moved at the same time. This is also true in the area B. Thus, although the shutter opening and closing part 29a is rotated, the coupling is not broken and follows the movement of the disk cartridge 1 in the form shown in FIG. 17(b). Then, when the shutter opening and closing part 29a reaches the area A and the shutter opening and closing part 29a is rotated, since the width L of the D-cut member is smaller than the width W of the contact portion 23 of the shutter 22, thereby making it become possible to release the coupling as shown in FIG. 17(c). Then, the disk cartridge 1 can be ejected from the disk apparatus as shown in FIG. 17(d).

When the disk cartridge is retained within the disk apparatus as described above, the shutter 22 and the shutter opening and closing member 29 are coupled to each other so that the shutter opening and closing member also is moved in accordance with the insertion/ejection of the disk cartridge. As a result, a spring, which is required by the conventional shutter opening and closing mechanism becomes unnecessary so that the disk cartridge apparatus can be reduced in thickness and that the number of the assemblies can be reduced. Furthermore, with respect to the shutter of the disk cartridge, there has hitherto been required an arrangement such as a spring for spring-biasing the shutter in the closing direction. However, according to the present invention, since the shutter also is closed in accordance with the movement of the shutter opening and closing member 29, such an arrangement can be omitted.

Figure 17E:
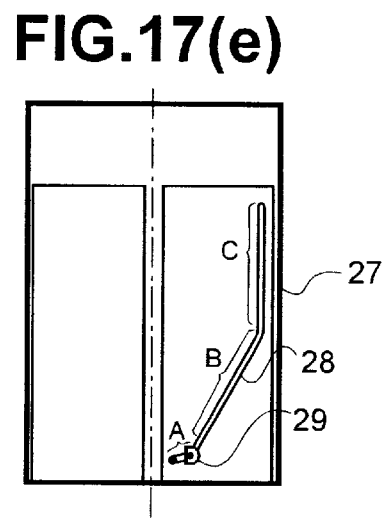

According to the present invention, as shown in FIGS. 16(e), 17(e), the shutter opening and closing mechanism can be retained within a space surrounding the guide slot 28 which occupies a space less than one-half of the space of the disk cartridge apparatus 27. Consequently, as shown in FIGS. 16(e), 17(e), the guide slot plate 24 can be arranged such that its portion near the center can be cut-out. If the guide slot plate has at its portion near the center cut-out as described above, then when the disk apparatus, for example, is a magneto-optical recording apparatus, it becomes possible to locate the magnetic head at this portion, and hence the space within the disk cartridge apparatus can be used effectively.

Also, in the shape of the guide slot 28 shown in FIGS. 16(e), 17(e), the shutter 22 is opened and closed in the range of the area B, and the shutter 22 is fully opened in the area C. At that time, the shape of the guide slot 28, in particular, the range and the inclination of the area B are important. When the disk cartridge 1 is inserted into the disk apparatus, it is considered that a clearance between a spindle motor for rotating an optical disk, for example, and a magnetic head and the disk cartridge 1 is narrow or they overlap with each other. To solve this problem, the shutter 22 of the disk cartridge 1 should be opened with priority, thereby avoiding contact with one another.

According to the present invention, since the opening operation of the shutter 22 is completed in the area C, it is recommended that the area C of the guide slot 28 should be located on the disk cartridge insertion opening side rather than the positions of the spindle motor and the magnetic head.

Figure 18:
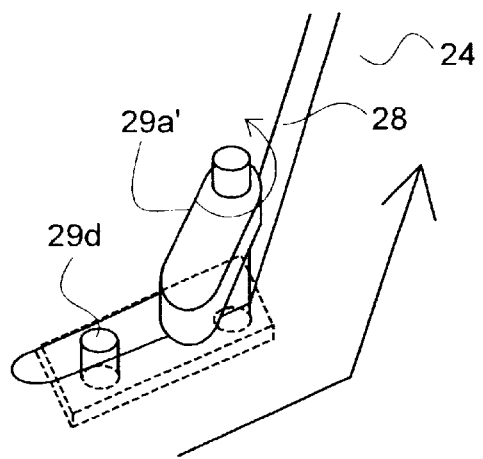
FIG. 18 shows a further embodiment of the present invention with respect to the configuration of the shutter opening and closing part of the disk cartridge apparatus.

While the D-cut member is used as the shutter opening and closing part 29a as described above, the present invention is not limited thereto, and the state in which the corner of a rectangular solid is rounded as shown in FIG. 18, for example, may be used as the shutter opening and closing part 29a' or any other structure may be used as the shutter opening and closing part so long as it can be coupled to the contact portion at the time point the disk cartridge 21 is inserted into the disk apparatus and can be released from the coupling after the disk cartridge was ejected from the disk apparatus finally.

Figure 19A:
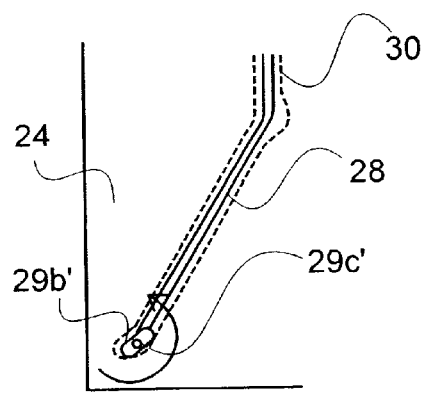
FIGS. 19(a)–19(b) show a modification of the embodiment of the present invention of FIG. 11 with respect to a mal-movement prevention structure for the shutter opening and closing part of the disk cartridge apparatus.

In the aforementioned embodiment, the shutter opening and closing pins 29c, 29d are inserted into the guide slot 28, and the direction of the shutter opening and closing member 29 and part 29a is changed by the angle of the guide slot 28. Another embodiment in which the direction of the shutter opening and closing pin is changed will be described with reference to FIGS. 19(a)–19(b). FIG. 19(a) shows the state in which only one shutter opening and closing pin 29c' is disposed on the guide base 29b' and this shutter opening and closing member 29c' is inserted into the guide slot 28. Moreover, the pin base 29b' is of an elongated shape with its respective ends being chamfered. A space or channel guide 30 for the guide base 29b' is formed under the guide slot plate 24, and a base guide 29b' is disposed within this channel guide 30 as shown in FIGS. 19(a) and 19(b).

Figure 19B:
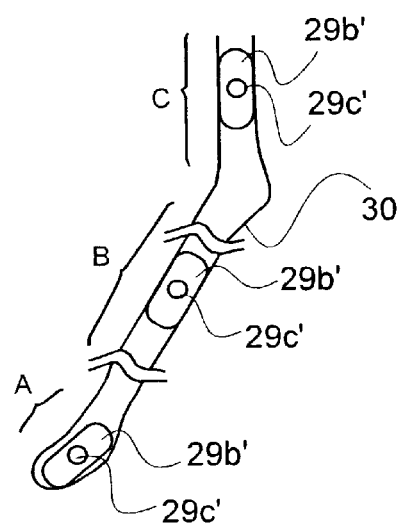

FIG. 19(b) shows the portions of the guide base 29b40 and the channel guide 30 in an enlarged scale. FIG. 19(b) show directions in which the guide base 29b' is located at arbitrary positions in the areas A, B and C of the channel guide 30, respectively. The channel guide 30 is set to be slightly larger than the width of the guide base 29b', and the guide base 29b' is able to move while it is brought in slight contact with the channel guide 30. According to the abovementioned arrangement, since the guide base 29b' is moved while it is being restricted by the channel guide 30, the shutter opening and closing part 29c' attached to the guide base 29b' is moved while the direction thereof is changed by the position of the guide base 29b'.

Figure 20A:
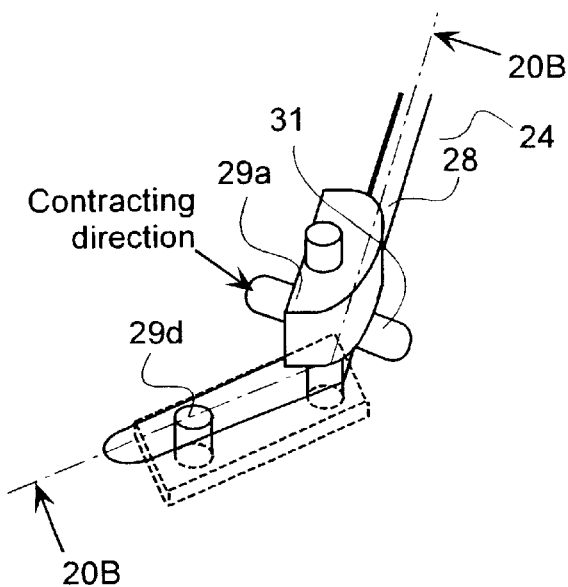
FIGS. 20(a)–20(b) show another modification of the embodiment of the present invention of FIG. 11 with respect to another mal-movement prevention structure for the shutter opening and closing part in combination with the disk cartridge apparatus.
Figure 20B:
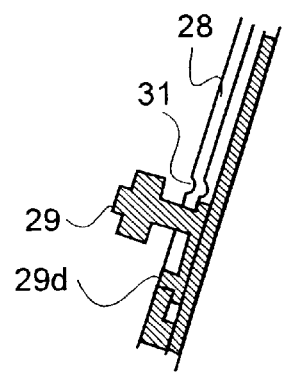

According to the present invention, the shutter opening and closing member 29 can be freely moved relative to the direction of the guide slot 28. However, the shutter opening and closing member should be constantly located in the area A before the disk cartridge 1 is inserted into the disk apparatus. Otherwise, the shutter opening and closing member 29 could not enter into the contact portion 23 so that the shutter 22 would become unable to slide. To solve this problem, it is recommended that the shutter opening and closing member 29 should be difficult to move from the area A when the disk cartridge 21 is not inserted into the disk cartridge apparatus. By way of example, as shown in FIGS. 20(a)–20(b), it is considered that a reduced thickness portion is provided as a partial shutter opening and closing member mal-movement preventing portion 31 of the guide slot plate 24. Thus, the shutter cannot be moved unless the shutter opening and closing member passes through this reduced thickness portion when the shutter opening and closing member 29 and the part 29a is located in the area A. When the disk cartridge 21 is inserted/ejected into/from the disk apparatus, the contact portion 23 of the shutter 22 forces the shutter opening and closing member 29 to move so that the shutter opening and closing part can pass through the contracted portion. However, when the disk cartridge 21 is not inserted into the disk apparatus, the contracted portion can inhibit the shutter opening and closing member 29 from being moved from the area A.

Figure 21A:
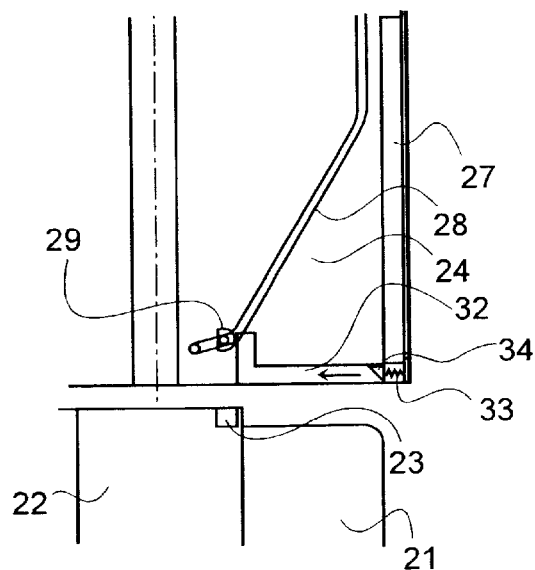
FIGS. 21(a)–21(b) show the manner in which the shutter opening and closing part mal-movement preventing structure also serves as a cartridge reverse insertion preventing structure.
Figure 21B:
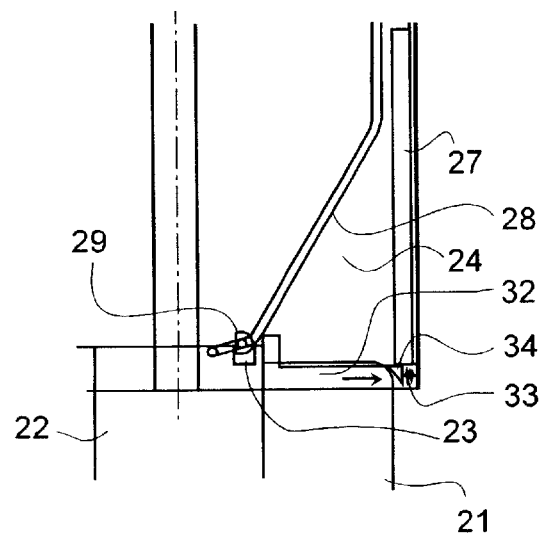
Figure 22:
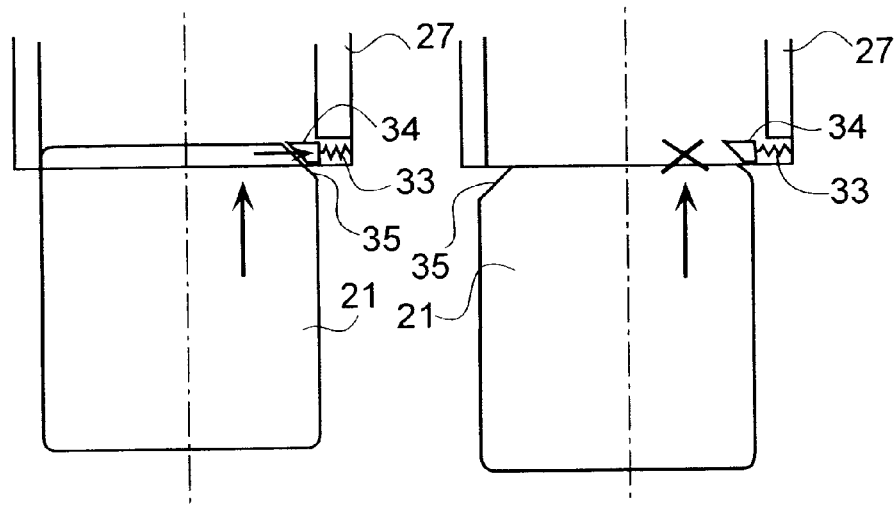
FIGS. 22(a)–22(b) show the manner in which the shutter opening and closing pin mal-movement preventing structure also serves as the cartridge reverse insertion preventing structure based upon the structure of the disk cartridge apparatus.
Figure 23:
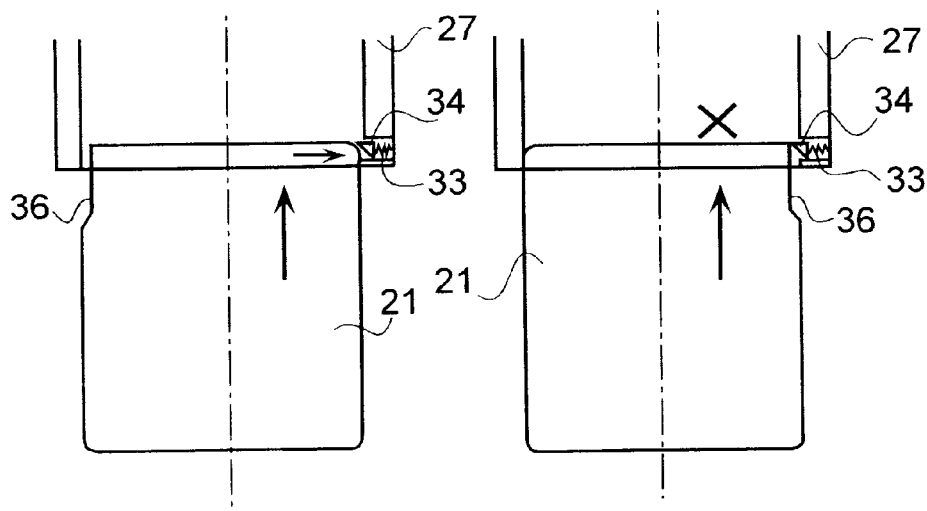
FIGS. 23(a)–23(b) show another embodiment of the opening and closing part of the disk cartridge apparatus.

FIGS. 21(a)–21(b) show a further embodiment in which the shutter opening and closing member 29 can be prevented from mal-moving. FIG. 21(a) shows the state that a stopper 32 for restricting movement of the shutter opening and closing member 29 is disposed on the disk cartridge guide case 27. A spring 33 and a stopper releasing member 34 are attached to the stopper 32, and the stopper 32 is generally urged against the shutter opening and closing member 29 side under spring force of the spring 33. As a consequence, the shutter opening and closing member 29 cannot be moved from the area A. When the disk cartridge 21 is inserted into the disk apparatus, the end of the disk cartridge 21 comes in contact with the stopper releasing member 34 as shown in FIG. 21(b). Since the stopper releasing member 34 is tapered as shown in the sheet of drawing, it can slide the spring 33 in the arrow direction in FIG. 21(b). Since the stopper releasing member 34 is attached to the stopper 32, when the stopper releasing member 34 is moved, the stopper 32 also is moved simultaneously, thereby releasing the restriction of the shutter releasing member 29. Thus, the shutter opening and closing member 29 becomes able to move freely in the direction of the guide slot 28. If it is arranged such that the shutter opening and closing member 29 can slide only when the disk cartridge 21 is inserted into the disk apparatus as described above, then the shutter opening and closing member 29 can be prevented from being moved inadvertently from the area A.

When the stopper 32, the spring 33 and the stopper releasing member 34 are used as described in the above embodiments, it can be avoided that the disk cartridge 21 is inserted into the disk apparatus upside down (hereinafter referred to as "reverse insertion"). FIGS. 22(a)–22(b) show such operation.

If the disk cartridge 21 is inserted into the disk apparatus upside down, then the tip end of the disk cartridge 21 is reversed as shown in FIGS. 22(a)–22(b). Utilizing this fact, the shapes of the tip end portion of the disk cartridge 21 and the stopper releasing member may be determined in such a manner that, when the disk cartridge is inserted into the disk apparatus in the correct direction, the stopper releasing member 34 may be moved correctly as shown in FIG. 22(a), and that, when the disk cartridge is inserted in the wrong direction, the stopper releasing member may be inhibited from being moved as shown in FIG. 22(b). Thus, when the disk cartridge 21 is inserted into the disk apparatus in the reverse direction as shown in FIG. 22(b), the stopper releasing member 34 is not moved so that the stopper 32 also is not moved, thereby resulting in the shutter opening and closing member 29 being restricted at the initial position. As a result, the insertion movement of the disk cartridge 21 can be obstructed by the shutter opening and closing member 29 and the disk cartridge cannot be inserted into the disk apparatus.

In the embodiment shown in FIGS. 22(a)–22(b), one of the tip ends or corner of the disk cartridge 21 is chamfered to provide a chamfered surface 35, but the other tip end or corner is not chamfered. Then, the stopper releasing member 34 is shaped as a trapezoid as illustrated. When the disk cartridge 21 is inserted into the disk apparatus in the correct direction, as shown in FIG. 22(a), the chamfered portion 35 and the tapered portion of the stopper releasing member 34 are initially brought in contact with each other so that the stopper releasing member 34 is slid in the right-hand direction in the sheet of drawing in accordance with the insertion of the disk cartridge 1. Thus, the stopper 32 releases the restriction of the movement of the shutter opening and closing member 29. On the other hand, when the disk cartridge 21 is inserted into the disk apparatus in the reverse direction, as shown in FIG. 22(b), the non-chamfered corner of the disk cartridge 21 contacts with a portion other than the tapered portion of the stopper releasing member 34, thereby inhibiting the stopper releasing member 34 from being moved. As a result, the shutter opening and closing member 29 remains restricted by the stopper 32 so that the disk cartridge 1 cannot be loaded into the disk apparatus.

FIGS. 23(a)–23(b) show yet a further embodiment in which the disk cartridge can be prevented from being inserted into the disk apparatus. In the embodiment shown in FIGS. 23(a)–23(b), a mal-insertion preventing slot 36 is provided at one tip end or corner of the disk cartridge and is not provided in the opposite tip end or corner. When the disk cartridge 21 is inserted into the disk apparatus in the correct direction, as shown in FIG. 23(a), the tip end or corner of the disk cartridge 1 contacts with the stopper releasing member 34 and the stopper releasing member 34 is moved in the right-hand side of the sheet of drawing with the result that the stopper 32 releases the restriction of the shutter opening and closing member 29. On the other hand, when the disk cartridge 21 is inserted into the disk apparatus in the reverse direction, as shown in FIG. 23(b), the stopper releasing member 34 is escaped into the mal-insertion preventing slot 36 of the disk cartridge 21, thereby resulting in the stopper releasing member 34 being inhibited from being moved. As a consequence, the shutter opening and closing member 29 remains restricted by the stopper 32 so that the disk cartridge 21 cannot be loaded into the disk apparatus.

While the two examples of the shapes of the disk cartridge 21 and the stopper releasing member 34 are described so far, the present invention is not limited thereto, and a variant of such structure is also possible that, when the disk cartridge 21 may be inserted into the disk apparatus in the correct direction, the stopper releasing member 34 may be moved, while when the disk cartridge may be inserted into the disk apparatus in the reverse direction, the stopper releasing member 34 may not be moved.

With the above-mentioned arrangements, in a recording/reproducing apparatus for recording/reproducing a disk housed in a cartridge, the disk cartridge apparatus can be reduced in thickness, miniaturized, and the number of assemblies thereof can be reduced.

What is claimed is:

1. A cartridge for use with a cartridge apparatus, the cartridge housing an information medium therein for at least one of recording information and reproducing information, the cartridge including an opening for enabling access to the information medium, and a shutter disposed on an outer surface of the cartridge and movable from a first position which covers the opening to a second position which uncovers the opening, the cartridge apparatus including a shutter opening and closing control mechanism having a member which engages the shutter when the cartridge is inserted into the cartridge apparatus and moves from an initial position where the shutter is in the first position to another position where the shutter is in the second position during insertion of the cartridge into the cartridge apparatus, the member being moved back to the initial position by the shutter when the cartridge is ejected from the cartridge apparatus without the member being spring biased by a portion of the cartridge apparatus.

2. A cartridge according to claim 1, wherein the information medium is in the form of a disk and the cartridge is a disk cartridge.

3. A cartridge according to claim 1, wherein the cartridge includes a spring for biasing the shutter to the first position when an external force is not applied to a part of the shutter.

4. A cartridge according to claim 1, wherein the shutter has a hook shaped portion which comes in contact with the member of the shutter opening and closing mechanism of the cartridge apparatus when the cartridge is inserted in the disk apparatus, the member enabling movement of the shutter from the first position to the second position.

5. A cartridge according to claim 4, wherein the hook shaped portion of the shutter is in the form of a one of a letter U and a letter C.

6. A cartridge according to claim 1, wherein the shutter opening and closing mechanism includes a guide slot having a locus substantially equal to an opening and closing locus presented when the shutter of the cartridge is inserted into the cartridge apparatus and a shutter opening and closing pin moveable along the guide slot.

7. A cartridge according to claim 1, wherein the mechanism of the opening and closing member engages the shutter so that the member moves along a predetermined path while engagement with the shutter and during insertion of the cartridge into the cartridge apparatus, the shutter is moved from the first position to the second position and upon ejection of the cartridge from the cartridge apparatus, the shutter is moved from the second position to the first position.

8. A cartridge according to claim 1, wherein when the cartridge is at least one of inserted into the cartridge apparatus and ejected therefrom, the opening and closing mechanism of the cartridge apparatus applies a force to the shutter in a direction substantially perpendicular to one of the insertion and ejection direction of the cartridge.

9. A cartridge according to claim 1, wherein the shutter opening and closing control mechanism includes a movement restrictor for at least partially restricting movement of the member which engages with the shutter.

10. A cartridge according to claim 1, wherein the member of the opening and closing mechanism which engages with the shutter includes a part which is rotatable along a path of movement thereof so as to engage and maintain engagement with the shutter during insertion of the cartridge into the cartridge apparatus and is rotatable to disengage from the shutter upon ejection of the cartridge from the cartridge apparatus.

11. A cartridge according to claim 1, wherein the member is moved back to the initial position by the shutter by direct mechanical engagement of the shutter and the member.

12. A cartridge for use with a cartridge apparatus, the cartridge housing an information medium therein for at least one of recording information and reproducing information, the cartridge including an opening for enabling access to the information medium, and a shutter disposed on an outer surface of the cartridge and movable from a first position which covers the opening to a second position which uncovers the opening, the cartridge apparatus including a shutter opening and closing control mechanism having a member which engages the shutter when the cartridge is inserted into the cartridge apparatus and moves from an initial position where the shutter is in the first position to another position where the shutter is in the second position during insertion of the cartridge into the cartridge apparatus, the member being moved back to the initial position by the shutter when the cartridge is ejected from the cartridge apparatus, wherein the shutter opening and closing control mechanism of the cartridge apparatus having the member which engages the shutter includes a plate having a slot therein, the member which engages the shutter being disposed for movement within the slot, the slot extending along a predetermined path from one end position proximate a center of the cartridge apparatus toward an edge of the cartridge apparatus and then extending substantially in parallel to the edge of the cartridge apparatus to another end position, the member which engages the shutter being arranged for engagement with a part of the shutter at an initial position of the member proximate to the one end of the slot upon insertion of the cartridge into the cartridge apparatus and during further insertion of the cartridge into the cartridge apparatus, the member which engages the part of the shutter during movement of the member along the slot causing the shutter to move from the first position which covers the opening to the second position which uncovers the opening until the cartridge is fully inserted in the cartridge apparatus so as to enable access of the information medium through the uncovered opening and enabling at least one of recording information and reproducing information to and from the information medium.

13. A cartridge according to claim 12, wherein upon full insertion of the cartridge into the cartridge apparatus, the member of the shutter opening and closing control mechanism is disposed at a position proximate to the another end position of the slot in the portion of the slot extending substantially parallel to the edge of the cartridge apparatus.

14. A cartridge according to claim 13, wherein, upon ejection of the cartridge from the cartridge apparatus, the member of the opening and closing control mechanism travels along the slot from the position proximate to the another end position to the initial position where the member disengages from the shutter enabling ejection of the cartridge from the cartridge apparatus.

15. A cartridge according to claim 12, wherein the member of the shutter opening and closing control mechanism includes at least a pin having a base portion disposed below the plate of the shutter opening and closing mechanism with the pin extending outwardly through the slot and projecting sufficiently to unable engagement with the part of the shutter.

16. A cartridge according to claim 12, wherein the part of the shutter which engages with the member of the opening and closing mechanism has a hook shape.

17. A cartridge according to claim 12, wherein the cartridge apparatus is configured to retain the member at the initial position thereof until a force is applied to the member by insertion of the cartridge into the cartridge apparatus sufficient to move the member from the initial position so as to travel along the slot, and upon ejection of the cartridge, the part of the shutter engages with the member to apply sufficient force so that the member travels along the slot to the initial position of the member and to disengage from the member to enable complete withdrawal of the cartridge from the cartridge apparatus.

18. A cartridge according to claim 17, wherein the cartridge includes a spring for biasing the shutter to the first position when an external force is not applied to a part of the shutter.

19. A cartridge apparatus for use with a cartridge, wherein the cartridge houses an information medium therein for at least one of recording information and reproducing information, the cartridge including an opening for enabling access to the information medium, and a shutter disposed on an outer surface of the cartridge and movable from a first position which covers the opening to a second position which uncovers the opening, the cartridge apparatus including a shutter opening and closing control mechanism having a member which engages the shutter when the cartridge is inserted into the cartridge apparatus and which moves from an initial position where the shutter is in the first position to another position where the shutter is in the second position during insertion of the cartridge into the cartridge apparatus, the member being moved back to the initial position by the shutter when the cartridge is ejected from the cartridge apparatus without the member being spring biased by a portion of the cartridge apparatus.

20. A cartridge apparatus according to claim 19, wherein the information medium is in the form of a disk, the cartridge is a disk cartridge, and the cartridge apparatus is a disk cartridge apparatus.

21. A cartridge apparatus according to claim 19, wherein the shutter opening and closing mechanism includes a guide slot having a locus substantially equal to an opening and closing locus presented when the shutter of the cartridge is inserted into the cartridge apparatus and a shutter opening and closing pin moveable along the guide slot.

22. A cartridge apparatus according to claim 19, wherein the member of the opening and closing mechanism engages the shutter so that the member moves along a predetermined path while engaged with the shutter and during insertion of the cartridge into the cartridge apparatus, the shutter is moved from the first position to the second position and upon ejection of the cartridge from the cartridge apparatus, the shutter is moved from the second position to the first position.

23. A cartridge apparatus according to claim 19, wherein when the cartridge is at least one of inserted into the cartridge apparatus and ejected therefrom, the opening and closing mechanism of the cartridge apparatus applies a force to the shutter in a direction substantially perpendicular to one of the insertion and ejection directions of the cartridge.

24. A cartridge apparatus according to claim 19, wherein the shutter opening and closing control mechanism includes a movement restrictor for at least partially restricting movement of the member which engages with the shutter.

25. A cartridge apparatus according to claim 19, wherein the member of the opening and closing mechanism which engages with the shutter includes a part which is rotatable along a path of movement thereof so as to engage and maintain engagement with the shutter during insertion of the cartridge into the cartridge apparatus and is rotatable to disengage from the shutter upon ejection of the cartridge from the cartridge apparatus.

26. A cartridge apparatus according to claim 19, wherein the part of the member of the opening and closing mechanism includes an elongated portion mounted on a pin, the pin being mounted on a substantially rectangular base member disposed beneath the plate and movable along the slot so that the rotatable part rotates during movement of the base member along the slot so as to engage with the shutter of the cartridge.

27. A cartridge apparatus according to claim 26, wherein another pin is mounted on the base member and spaced from the pin having the part mounted thereon, the another pin being disposed within the slot without projecting above the plate.

28. A cartridge apparatus according to claim 27, wherein the part which is rotatable is a D-shaped partially cylindrical part.

29. A cartridge apparatus according to claim 19, wherein the shutter opening and closing control mechanism is configured to restrict a movement direction of the member which engages the shutter so that the member is moved in a direction for causing the shutter to move from the first position to the second position thereof while the member is moved in the insertion direction of the cartridge apparatus, and the member being restricted for movement in the direction in which the shutter moves from the second position to the first position while the member is moved in the ejection direction of the cartridge apparatus.

30. A cartridge apparatus according to claim 29, wherein the member and the shutter are coupled by rotation of the member as the cartridge is inserted into the cartridge apparatus and the member is coupled to the shutter until the member reaches the initial position thereof when the cartridge is ejected from the cartridge apparatus, the member being released from the shutter by rotation of the member after the member reaches the predetermined position.

31. A cartridge apparatus according to claim 29, further comprising mal-movement preventing means for preventing movement of the member from the initial position thereof when the cartridge is not inserted into the cartridge apparatus.

32. A cartridge apparatus according to claim 31, further comprising means for preventing the cartridge from being fully inserted into the cartridge apparatus by inhibiting the member from moving from the initial position when the cartridge is inserted into the cartridge apparatus upside down.

33. A cartridge according to claim 19, wherein the member is moved back to the initial position by the shutter by direct mechanical engagement of the shutter and the member.

34. A cartridge apparatus apparatus for use with a cartridge, wherein the cartridge houses an information medium therein for at least one of recording information and reproducing information, the cartridge including an opening for enabling access to the information medium, and a shutter disposed on an outer surface of the cartridge and movable from a first position which covers the opening to a second position which uncovers the opening, the cartridge apparatus including a shutter opening and closing control mechanism having a member which engages the shutter when the cartridge is inserted into the cartridge apparatus and which moves from an initial position where the shutter is in the first position to another position where the shutter is in the second position during insertion of the cartridge into the cartridge apparatus, the member being moved back to the initial position by the shutter when the cartridge is elected from the cartridge apparatus, wherein the shutter opening and closing control mechanism of the cartridge apparatus having the member which engages the shutter includes a plate having a slot therein, the member which engages the shutter being disposed for movement within the slot, the slot extending along a predetermined path from one end position proximate a center of the cartridge apparatus toward an edge of the cartridge apparatus and then extending substantially in parallel to the edge of the cartridge apparatus to another end position, the member which engages the shutter being arranged for engagement with a part of the shutter at an initial position of the member proximate to the one end of the slot upon insertion of the cartridge into the cartridge apparatus and during further insertion of the cartridge into the cartridge apparatus, the member which engages the part of the shutter during movement of the member along the slot causing the shutter to move from the first position which covers the opening to the second position which uncovers the opening until the cartridge is fully inserted in the cartridge apparatus so as to enable access of the information medium through the uncovered opening and enabling at least one of recording information and reproducing information to and from the information medium.

35. A cartridge apparatus according to claim 34, wherein upon full insertion of the cartridge into the cartridge apparatus, the member of the shutter opening and closing control mechanism is disposed at a position proximate to the another end position of the slot in the portion of the slot extending substantially parallel to the edge of the cartridge apparatus.

36. A cartridge apparatus according to claim 35, wherein, upon ejection of the cartridge from the cartridge apparatus, the member of the opening and closing control mechanism travels along the slot from the position proximate to the another end position to the initial position where the member disengages from the shutter enabling ejection of the cartridge from the cartridge apparatus.

37. A cartridge apparatus according to claim 34, wherein the member of the shutter opening and closing control mechanism includes at least a pin having a base portion disposed below the plate of the shutter opening and closing mechanism with the pin extending outwardly through the slot and projecting sufficiently to unable engagement with the part of the shutter.

38. A cartridge according to claim 34, wherein the cartridge apparatus is configured to retain the member at the initial position thereof until a force is applied to the member by insertion of the cartridge into the cartridge apparatus sufficient to move the member from the initial position so as to travel along the slot, and for ejection of the cartridge, the part of the shutter engages with the member to apply sufficient force so that the member travels along the slot to the initial position of the member and disengages from the member to enable complete withdrawal of the cartridge from the cartridge apparatus.

39. A cartridge apparatus according to claim 34, wherein the plate includes a guide channel extending along and having a width greater than a width of the slot, the member which engages the shutter including a base movable along the guide channel and having a part extending through the slot and projecting above the surface of the plate which engages the shutter.

* * * * *